(12) United States Patent
Nandwani et al.

(10) Patent No.: US 8,935,954 B2
(45) Date of Patent: Jan. 20, 2015

(54) METHOD AND APPARATUS FOR TESTING PISTON SEALS

(75) Inventors: Sunil Nandwani, Troy, MI (US);
Ranajit Ghosh, Novi, MI (US); John S. Agapiou, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 226 days.

(21) Appl. No.: 13/611,542

(22) Filed: Sep. 12, 2012

(65) Prior Publication Data

US 2014/0069179 A1 Mar. 13, 2014

(51) Int. Cl.
*G01M 13/02* (2006.01)
(52) U.S. Cl.
USPC ........................................................ 73/115.02
(58) Field of Classification Search
CPC ..................................................... G01M 13/02
USPC ............... 73/114.77, 114.78, 115.02, 115.03, 73/115.04
See application file for complete search history.

(56) References Cited

U.S. PATENT DOCUMENTS

| 5,435,187 A * | 7/1995 | Ewy et al. ........................ 73/856 |
| 7,549,326 B2 * | 6/2009 | Cummings et al. ......... 73/114.77 |
| 2008/0202203 A1 * | 8/2008 | Cummings et al. ................. 73/9 |
| 2010/0313642 A1 * | 12/2010 | Vroege et al. .............. 73/114.77 |

* cited by examiner

*Primary Examiner* — Eric S McCall

(57) ABSTRACT

A seal testing apparatus includes a clamp assembly which receives, secures and rotates a piston and seal assembly, a mandrel which extends into the seal assembly and supports a guide which carries a spring biased sensing probe or tooth which is oriented along the axis of the mandrel. In another embodiment, the components are the similar except that the probe or tooth is disposed in the mandrel and extends circumferentially. In both embodiments, data from an optical, laser or acoustic sensor is analyzed to determine the integrity of the piston seal. Yet another embodiment includes an arbor which rotates the seal and an adjacent contra-rotating cylinder having a conical mirror. As the seal, arbor and cylinder rotate, light reflected off the mirror and the seal, and returned to the mirror and a sensor provide data which is again analyzed to determine the integrity of the piston seal.

15 Claims, 4 Drawing Sheets

US 8,935,954 B2

METHOD AND APPARATUS FOR TESTING PISTON SEALS

FIELD

The present disclosure relates to testing piston seals and more particularly to a method and apparatus for testing the integrity of elastomeric seals for pistons utilized in, for example, motor vehicle transmissions.

BACKGROUND

The statements in this section merely provide background information related to the present disclosure and may or may not constitute prior art.

Hydraulic transducers, that is, devices that are powered by pressurized hydraulic fluid and convert such energy to linear translation and force are common components of many power transmission and control devices. Hydraulic actuators or operators, as they are commonly called, find wide application of motor vehicle automatic transmissions and dual clutch transmissions (DCT's). The operability and service life of such actuators is related almost exclusively to the integrity of the elastomeric seal disposed between the translating component, the piston, and the stationary component, the housing. If the seal is defective, either upon assembly or later becomes so, the actuator will, at a minimum, leak and thus require more time to operate, may not be capable of achieving full design force and waste pressurized hydraulic fluid which could adversely impact operation of other components or the entire transmission. In a worst case scenario, the leak is so severe that the actuator simply does not respond to pressure inputs and fails to properly translate the associated, clutch, brake, shift fork or other component.

Viewed from a chronological perspective rather than from the degree of failure, it is one type of difficulty to have the seal fail after years of service and tens of thousands of miles of travel and another to have the seal fail essentially upon installation because of a manufacturing defect. It is therefore apparent that by inspecting each piston seal the latter type of failure can be virtually eliminated. The present invention is thus directed to a method and apparatus of inspecting piston seals, detecting flaws in such seals and accepting flawless piston seals and rejecting flawed piston seals.

SUMMARY

The present invention provides an apparatus for inspecting a hydraulic piston seal and detecting flaws or defects which could compromise the service life of the piston seal or interfere with proper operation of the piston and associated components. In a first embodiment, the apparatus includes a clamp assembly which receives, secures and rotates a piston and seal assembly, a mandrel which extends into the seal assembly and supports a guide which carries a spring biased sensing probe or tooth which is oriented along the axis of the mandrel. In a second embodiment, the components are the same except that the probe or tooth is disposed in the mandrel and is oriented circumferentially. In both embodiments, the sensing probe may include a light and data from an optical, laser or acoustic sensor is analyzed to determine the integrity of the piston seal. A third embodiment includes an arbor which rotates the seal and an adjacent contra-rotating cylinder having a conical mirror located therein. As the seal, arbor and cylinder rotate, light reflected off the mirror and the seal, and returned to the mirror and a sensor provide data which is again analyzed to determine the integrity of the piston seal.

Thus it is an aspect of the present invention to provide an apparatus for determining the integrity of a piston seal.

It is a further aspect of the present invention to provide an apparatus for determining the integrity of a piston seal having a sensing probe or tooth which scans the circumference of the piston seal.

It is a further aspect of the present invention to provide an apparatus for determining the integrity of a piston seal having a lighted sensing probe or tooth which scans the circumference of the piston seal.

It is a further aspect of the present invention to provide an apparatus for determining the integrity of a piston seal having an optical, laser or acoustic sensor for detecting flaws in the seal.

It is a further aspect of the present invention to provide an apparatus for determining the integrity of a piston seal having rotating cylinder having a conical mirror disposed therein.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
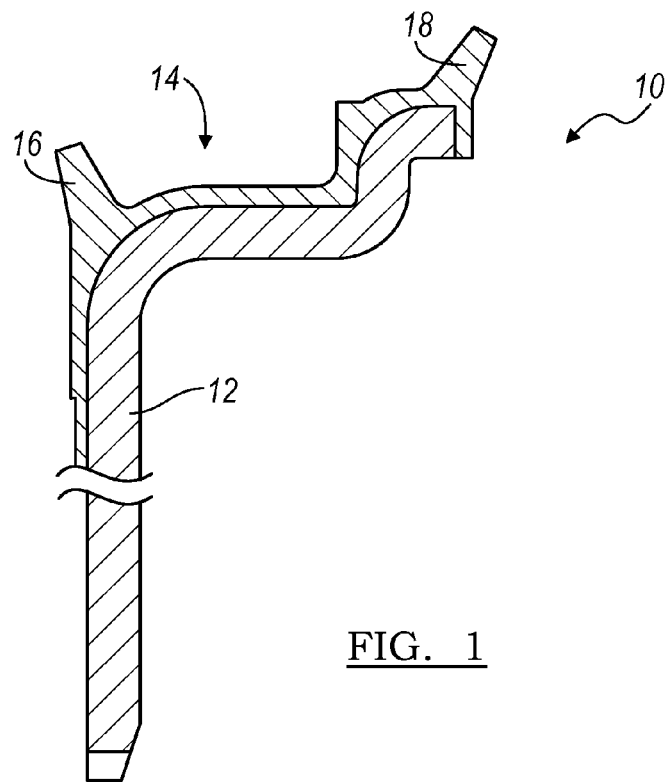
FIG. 1 is a half sectional view of a typical piston and seal assembly which may undergo testing by the present invention.

With reference now to FIG. 1, a typical and exemplary piston and seal assembly which may be tested with the present invention is illustrated and generally designated by the reference number 10. The piston and seal assembly 10 which is circular includes a body portion 12 having a generally "L" shaped cross section. The body portion 12 is preferably fabricated of metal such as aluminum and includes a molded in place gasket or seal 14 of an elastomeric material. The gasket or seal 14 may take various forms but typically includes a first, outer circumferential oblique flange or lip 16 and a second, inner circumferential oblique flange or lip 18. It will be appreciated that when installed in a cylinder (not illustrated), the outer flange or lip 16 and the inner flange or lip 18 of the piston and seal assembly 10 are displaced slightly more into alignment with the elongate (axially extending) section of the body portion 12.

Figure 2:
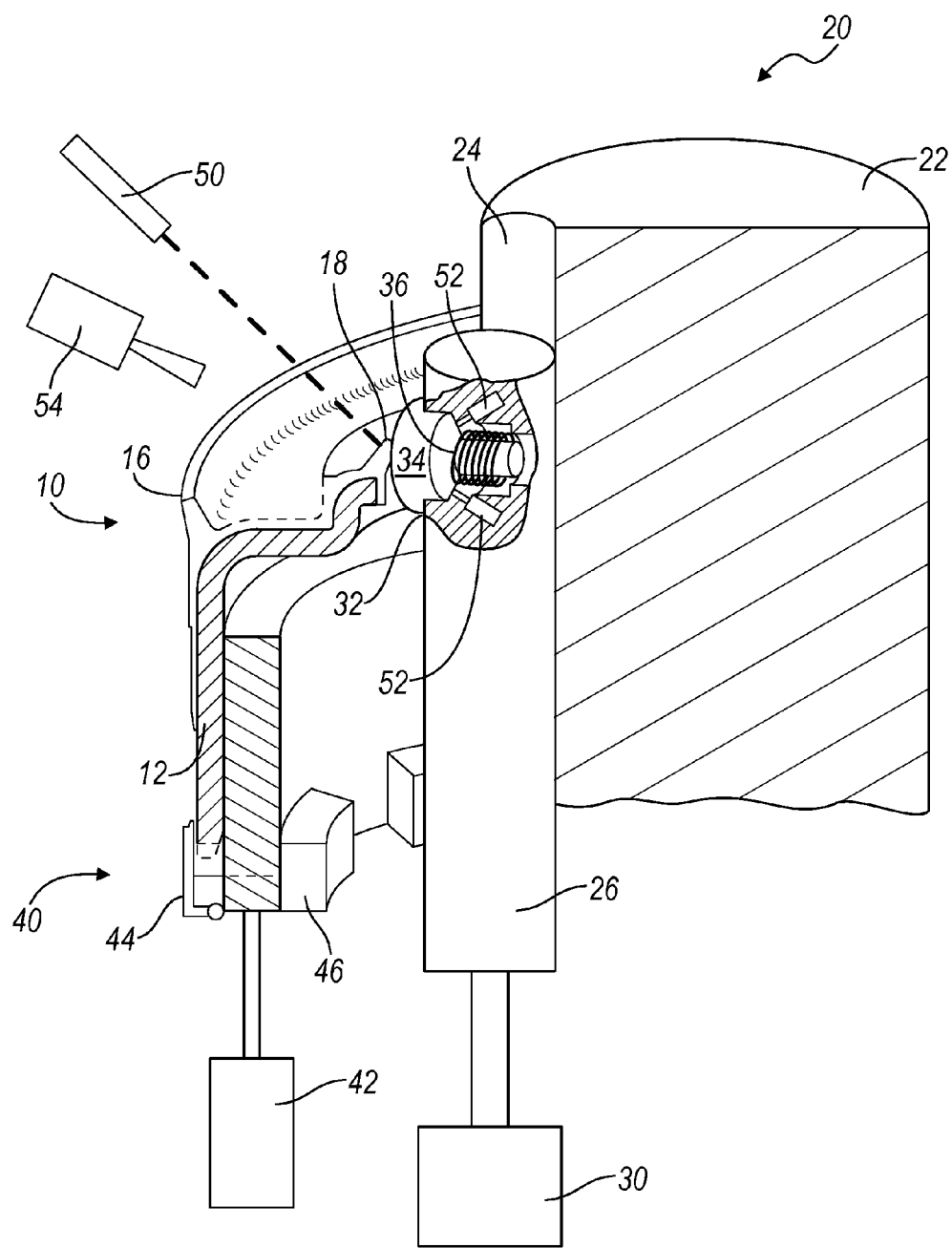
FIG. 2 is a diagrammatic, sectional view of a first embodiment of a piston seal test apparatus according to the present invention.

Referring now to FIG. 2, a test apparatus for an elastomeric seal 14 such as included in the piston and seal assembly 10 is illustrated and generally designated by the reference number 20. The test apparatus 20 includes a stationary center fixture or mandrel 22 having an outside diameter smaller than the inside diameter of the piston and seal assembly 10 or similar seal structure to be tested. One wall of the fixture or mandrel 22 defines an axial, semicircular channel 24 which receives a cylindrical rod or guide 26. The cylindrical rod or guide 26 is coupled to and axially translated by a bi-direction drive mechanism 30 which may include a hydraulic cylinder, a electric motor and cam or a linear actuator, for example. The cylindrical rod or guide 26 defines an axially (vertically) extending aperture 32 through which projects a spring biased, convex sensing finger, probe or tooth 34. A compression spring 36 which may be a coil spring or a leaf spring disposed behind the sensing probe or tooth 34 may be selected for its spring rate (constant) to provide suitable distorting pressure to a particular inner flange or lip 18 so that tears, non-fills, blisters and other defects of the flange or lip 18 may be detected as will be more fully explained subsequently.

Surrounding the fixture or mandrel 22 is a rotatable ring assembly 40 that is coupled to and driven by a suitable drive mechanism 42 such as an electric motor and speed reduction unit that rotates the ring 40 through at least 370°, that is, more than a full circle, during each operating (inspection) cycle. The rotatable ring assembly 40 includes one or more clamp members 44 that may be actuated by one or more solenoids or hydraulic pistons 46 to releasably secure a piston and seal assembly 10 to the rotatable ring assembly 40 during the test procedure.

The test apparatus 20 also includes a machine vision, laser or air nozzle inspection device 50 for tracking and inspecting the inner flange or lip 18 as it is clamped in the rotatable ring and rotated through 370°, as noted above. If a machine vision sensor is utilized as the inspection device 50, the device 50 will be programmed to recognize discontinuities in the flanges or lips 16 and 18 which could indicate tears or changes in the reflectivity which could indicate blisters or non-fills. Additionally, the sensing probe or tooth 34 may be translucent or transparent and include one or more light sources 52. The light from the light sources 52 is preferably directed radially outwardly to improve the imaging and fault detection of the machine vision sensor. If a laser sensor, a reflective component such as a mirror on the opposite side of the flange or lip 16 and 18 from the laser will facilitate the detection of tears. This can be achieved by silvering the face of the sensing probe or tooth 34 or fabricating it of metal which is highly polished.

Another option is an air nozzle which is utilized as the inspection device 50 which directs pressurized air toward the sensing probe or tooth 34 and an acoustic sensor 54. As the piston and seal assembly 10 is rotated, the signal from the acoustic sensor 54 will be substantially uniform until a defect is encountered at which time the acoustic footprint (frequency spectrum and loudness) will change. Again, the inspection device 50 can be programmed to recognize faults and reject piston and seal assemblies 10 accordingly. In any case, the scanning of the second, inner flange or lip 18, fault detection, data storage and accept/reject output signals will be synchronized with the rotation of the piston and seal assembly 10 and the rotatable ring assembly 40 such that the exact location or locations of defects on the inner flange or lip 18 can be specified so that a visual inspection and further analysis of the piston and seal assembly 10 may be readily undertaken, if desired.

Figure 3:
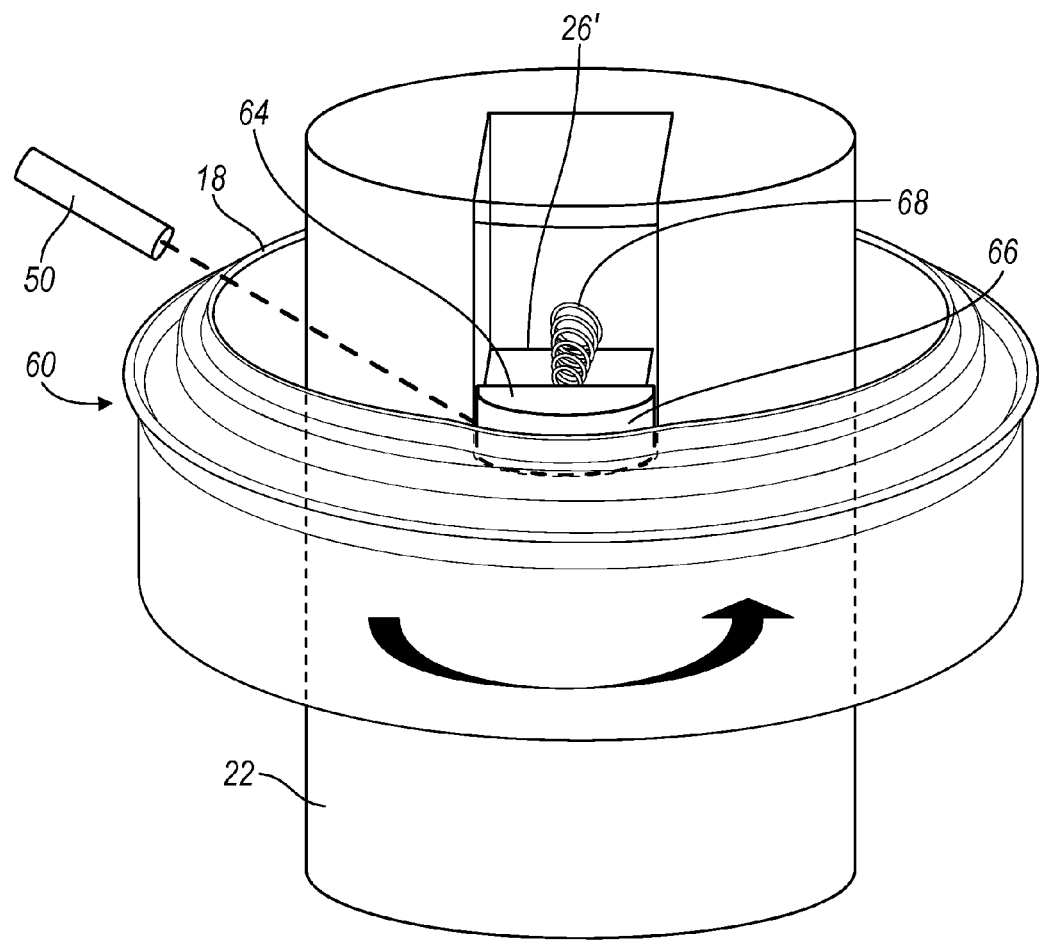
FIG. 3 is a perspective view of a second embodiment of a piston seal test apparatus according to the present invention.

FIG. 3 illustrates a second embodiment of a piston seal test apparatus which is generally designated by the reference number 60. The second embodiment piston seal test apparatus 60 is similar in most respects to the first embodiment piston seal test apparatus 10 and includes the mandrel 22 and a sliding guide or support 26'. In the second embodiment 60, the guide or support 26' translates radially and, at its outward end, includes a circumferentially (horizontally) extending spring biased sensing finger, probe or tooth 64 having a curved, convex end surface 66. Again, a compression spring 68 which may be a coil spring or a leaf spring behind the sensing probe or tooth 64 provides a restoring force directed radially outwardly from the guide or support 26' and may be selected for its spring rate (constant) to provide suitable distorting pressure to a particular inner flange or lip 18 so that tears and other defects of the inner flange or lip 18 may be detected. The spring biased sensing finger, probe or tooth 64 may also include one or more light sources 52, as illustrated in FIG. 2. Similarly, the spring biased sensing finger, probe or tooth 64 may be fabricated of polished metal or it may be silvered, as described above with regard to the first embodiment spring biased sensing finger, probe or tooth 34.

Figure 4:
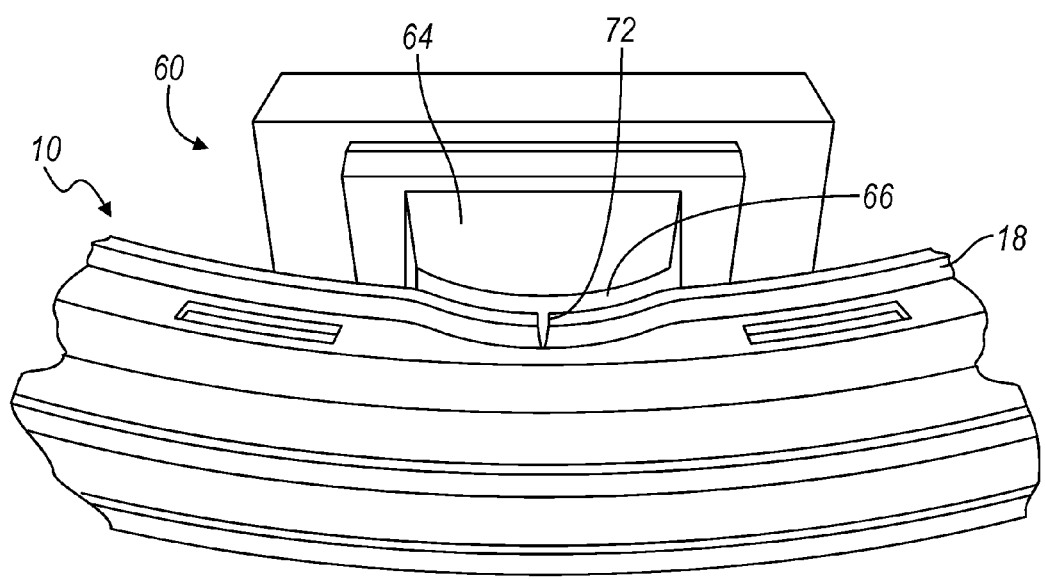
FIG. 4 is a diagrammatic view of a defective piston seal in place on the second embodiment of a piston seal test apparatus according to the present invention.

FIG. 4 is a diagrammatic view of a piston and seal assembly 10 in place on the rotatable ring assembly 40 of the second embodiment test apparatus 60. In this view, the inner flange or lip 18 of the piston seal assembly 10 has a tear or discontinuity 72. With either a machine vision or laser inspection device 50, the tear or discontinuity 72 appears as a light, white or reflective, that is, non-dark, opening in the inner flange or lip 18 and, with suitable calibration and/or algorithms and programming, the inspection device 50 recognizes the tear or discontinuity 72 as a flaw and rejects the piston and seal assembly 10. When the inspection device 50 is an air nozzle and the acoustic sensor 54 (illustrated in FIG. 2) is utilized, suitable algorithms or audio spectrum look up tables will provide suitable identification of the flaw. It should be appreciated that a similar situation exists with regard to other flaws in the piston and seal assembly 10 such as non-fills, blisters and the like.

Figure 5:
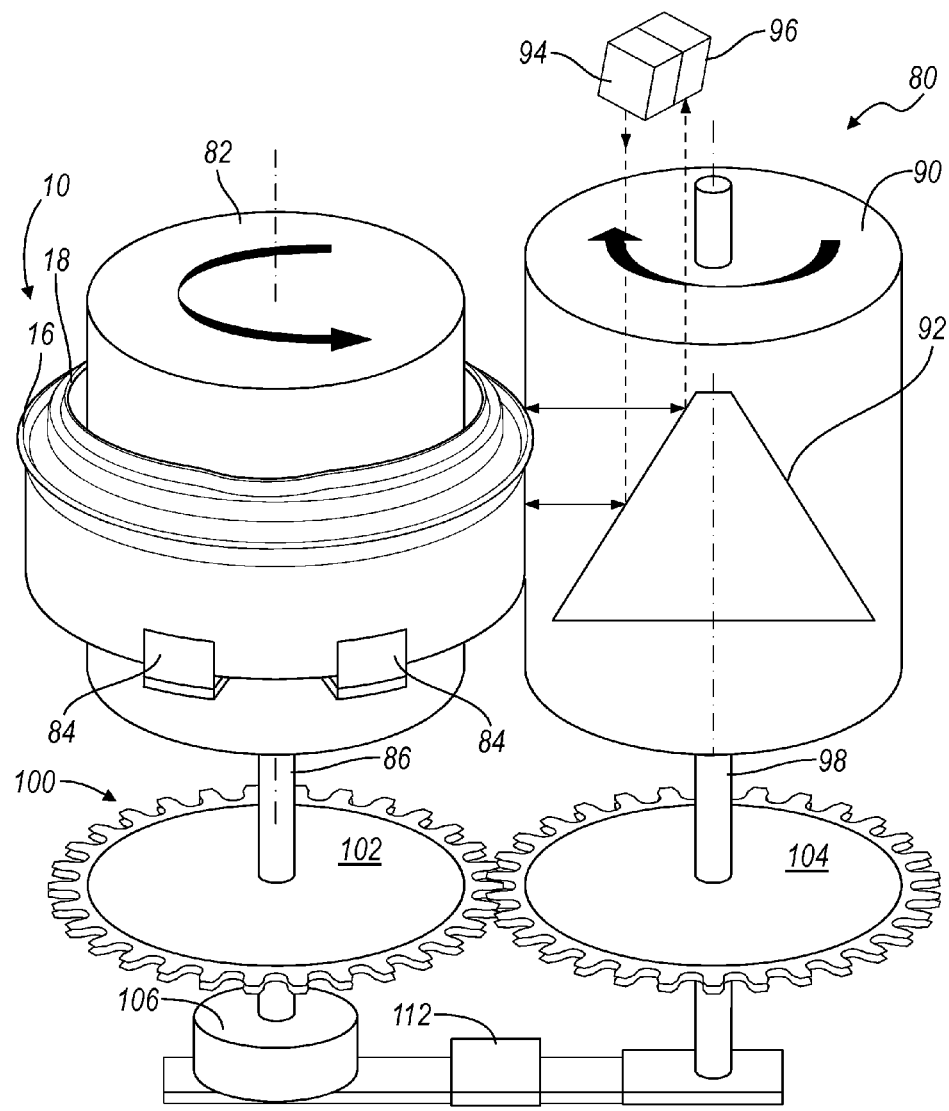
FIG. 5 is a diagrammatic view of another embodiment of a piston seal test apparatus according to the present invention.

FIG. 5 illustrates yet another embodiment of the piston and seal assembly test apparatus which is illustrated and generally designated by the reference number 80. The seal assembly test apparatus 80 is specifically designed and intended to detect flaws or faults in the first, outer flange or lip 16. As such, it operates about and around the periphery of the piston and seal assembly 10, in contact with the outer flange or lip 16. The third embodiment of the seal assembly test apparatus 80 includes a rotatable arbor or mandrel 82 which receives the piston and seal assembly 10 under test. The piston and seal assembly 10 is secured to the arbor or mandrel 82 by one or more clamp assemblies 84.

Adjacent the arbor or mandrel 82 is a contra-rotating transparent, i.e., clear plastic or glass, rotatable cylinder 90. The cylinder 90 includes a conical mirror or silvered surface 92 oriented at an angle of 45° to the axis of the cylinder 90 and its axis of rotation. Disposed above the cylinder 90 are both a source of light 94 and a light sensor 96. Preferably, the light source 94 is a laser, LED or incandescent light and lens to provide a focused and preferably coherent light beam. The light sensor 96 is preferably a laser compatible device, other sensor or a plurality of small, individual sensors capable of providing a high definition signal to associated data storage and computational devices including algorithms and programs which process the data from the light sensor 96 and provide either or both an accept/reject signal and information regarding the location, size and type of defect to assist in its subsequent manual location and provide quality control information.

The rotatable arbor or mandrel 82 and the cylinder 90 are supported on suitable shafts 86 and 98. A drive assembly 100 includes mating spur gears 102 and 104 on the respective shafts 86 and 98 and a drive assembly 106 which may include an electric motor and a speed reduction unit and which directly drives one of the spur gears 102 and 104, for example, the spur gear 102. The spur gears 102 and 104 are sized so that the peripheral, i.e., circumferential, surface speeds of the outer flange or lip 16 of the piston and seal assembly 10 in place on the arbor or mandrel 82 and the transparent cylinder 90 are equal or nearly so and the use of the two spur gears 102 and 104 ensures that the shafts 86 and 98 rotate in the opposite direction. It will be appreciated, however, that other drive arrangements may be utilized that will provide the necessary relative rotational speeds and contra-rotation. Such surface speed synchronization ensures that the force applied by the transparent cylinder 90 is substantially radially directed against the outer flange or lip 16.

The drive assembly 100 also includes a bi-directional linear actuator 112 which separates the arbor or mandrel 82 and the transparent cylinder 90 to facilitate mounting of a piston and seal assembly 10 on the arbor or mandrel 82 and draws them together and provides a biasing force so that, in a manner similar to the deforming force provided by the sensing teeth, probes or fingers 34 and 66, the transparent cylinder 90 contacts the outer flange or lip 16 of the piston and seal assembly 10 and deforms it to facilitate detection of tears, flaws and other irregularities.

The description of the invention is merely exemplary in nature and variations that do not depart from the gist of the invention are intended to be within the scope of the invention. Such variations are not to be regarded as a departure from the spirit and scope of the invention.

What is claimed is:

1. An apparatus for testing piston seals comprising, in combination,
    a rotatable clamp assembly adapted to receive and secure a piston and seal assembly, said clamp assembly defining a center opening,
    a mandrel having a sidewall, disposed in said center opening of said clamp assembly and having an axial channel formed in said sidewall,
    a cylindrical guide disposed for axial motion in said axial channel of said mandrel, said cylindrical guide defining an aperture,
    a spring biased sensing tooth extending from said aperture of said cylindrical guide, and
    means proximate said sensing tooth for detecting a fault in such piston and seal assembly.

2. The testing apparatus of claim 1 wherein said means for detecting includes a machine vision sensor.

3. The testing apparatus of claim 1 wherein said means for detecting includes a laser light source.

4. The testing apparatus of claim 1 wherein said means for detecting includes an air nozzle and acoustic sensor.

5. The testing apparatus of claim 1 further including means for rotating said clamp assembly more than 360° and means for axially translating said cylindrical guide.

6. The testing apparatus of claim 1 wherein said clamp assembly includes a plurality of circumferentially spaced apart clamp members.

7. The testing apparatus of claim 1 further including a spring and a light source disposed behind said sensing tooth in said cylindrical guide.

8. An apparatus for testing piston seals comprising, in combination,
    a rotatable arbor assembly defining a first axis and adapted to receive a piston and seal assembly,
    clamp means for securing such piston and seal assembly to said rotatable arbor assembly,
    a transparent rotatable cylinder defining a second axis parallel to said first axis and disposed adjacent said rotatable arbor, said cylinder including a conical mirror disposed about said second axis,
    a source of light directed parallel to said axes toward said mirror and redirected by said mirror toward a seal on said piston and seal assembly
    means proximate said source of light for receiving light reflected from said seal on said piston and seal assembly and said mirror.

9. The apparatus for testing piston seals of claim 8 further including drive means coupled to and driving said arbor assembly and said cylinder in opposite directions.

10. The apparatus for testing piston seals of claim 8 further including means for translating said arbor and said cylinder away from one another to facilitate mounting of a piston and seal assembly in said clamp means and translating said arbor and said cylinder toward one another to undertake testing.

11. The apparatus for testing piston seals of claim 8 wherein said source of light is a laser.

12. A method of testing seals of pistons and seal assemblies comprising the steps of:
    providing a rotatable clamp assembly,
    clamping a piston and seal assembly in said rotatable clamp assembly,
    providing a guide having a sensing tooth and disposing said sensing tooth in distorting contact with a seal of said piston and seal assembly,
    providing a sensor adjacent said sensing tooth,
    rotating said clamp and said piston and seal assembly in excess of 360°, and
    accepting or rejecting said piston and seal assembly based on data provided by said sensor.

13. The method of claim 12 wherein said sensor is one of an optical, laser or acoustic sensor.

14. The method of claim 12 further including the steps of spring biasing said sensing tooth and providing a source of light in said sensing tooth.

15. The method of claim 12 wherein said rotatable clamp assembly clamps said piston and seal assembly at a plurality of locations.

* * * * *